(12) United States Patent
Kuang et al.

(10) Patent No.: US 10,876,257 B2
(45) Date of Patent: Dec. 29, 2020

(54) WATER-INDUCED ANTI-COUNTERFEITING PAPER AND PREPARATION METHOD THEREOF

(71) Applicant: SOUTH CHINA UNIVERSITY OF TECHNOLOGY, Guangdong (CN)

(72) Inventors: Yudi Kuang, Guangdong (CN); Gang Chen, Guangdong (CN); Junqi Zhang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 325 days.

(21) Appl. No.: 15/745,998

(22) PCT Filed: Dec. 10, 2016

(86) PCT No.: PCT/CN2016/109353
§ 371 (c)(1),
(2) Date: Jan. 19, 2018

(87) PCT Pub. No.: WO2017/185760
PCT Pub. Date: Nov. 2, 2017

(65) Prior Publication Data
US 2018/0223480 A1 Aug. 9, 2018

(30) Foreign Application Priority Data
Apr. 28, 2016 (CN) .......................... 2016 1 0282047

(51) Int. Cl.
*D21H 21/44* (2006.01)
*C09D 11/50* (2014.01)
(Continued)

(52) U.S. Cl.
CPC .......... *D21H 21/44* (2013.01); *B42D 25/378* (2014.10); *C09D 11/03* (2013.01); *C09D 11/06* (2013.01);
(Continued)

(58) Field of Classification Search
CPC ......... C09D 11/03; C09D 11/06; C09D 11/08; C09D 11/30; C09D 11/50; B42D 25/378; D21H 21/44; B41M 3/14
See application file for complete search history.

(56) References Cited

U.S. PATENT DOCUMENTS 4,990,284 A * 2/1991 Lauterbach ............ B65D 79/02
106/31.64
5,258,065 A * 11/1993 Fujisawa ................... A61L 2/28
436/1
(Continued)

FOREIGN PATENT DOCUMENTS

| CN | 1155564 | 7/1997 |
|---|---|---|
| CN | 1562647 | 1/2005 |

(Continued)

OTHER PUBLICATIONS

Su, CN 203174437, Machine Translation via EPO.*
"International Search Report (Form PCT/ISA/210)", dated Feb. 28, 2017, with English translation thereof, pp. 1-6.

*Primary Examiner* — Laura C Powers
(74) *Attorney, Agent, or Firm* — JCIPRNET

(57) ABSTRACT

The present invention discloses a water-induced anti-counterfeiting paper and a preparation method thereof, belonging to the field of anti-counterfeiting technology of paper. The water-induced anti-counterfeiting paper consists of a base paper layer and an anti-counterfeiting label thereon. The anti-counterfeiting label is a colorless, invisible pattern or character, and does not have any effect on the appearance of the base paper. When contacting with water, a transparency of a location where the paper has the anti-counterfeiting label increases, and thereby a character or a pattern appears. After drying, the character or the pattern disappears, and the paper reverted to normal. The water-induced anti-counterfeiting paper may be prepared by method of printing the (Continued)

anti-counterfeiting label at a surface of the base paper by processes such as printing, code-spurting and inkjet printing according to requirements. Compared with the existing anti-counterfeiting surface-printing technology and other anti-counterfeiting embedment technology, the water-induced anti-counterfeiting paper is low in cost, the process is simple, and is not easy to be imitated; and its identification method is simple, its anti-counterfeiting effect is remarkable, and detection is repeatable.

8 Claims, 1 Drawing Sheet

(51) Int. Cl.
| | |
|---|---|
| *C09D 11/30* | (2014.01) |
| *B42D 25/378* | (2014.01) |
| *C09D 11/03* | (2014.01) |
| *C09D 11/06* | (2006.01) |
| *C09D 11/08* | (2006.01) |
| *B41M 3/14* | (2006.01) |

(52) U.S. Cl.
CPC .............. *C09D 11/08* (2013.01); *C09D 11/30* (2013.01); *C09D 11/50* (2013.01); *B41M 3/14* (2013.01)

(56) References Cited

U.S. PATENT DOCUMENTS

| | | | |
|---|---|---|---|
| 5,984,467 A * | 11/1999 | Bodager | .............. B41M 5/0256 347/101 |
| 7,105,225 B2 * | 9/2006 | Birkholz | ................... B32B 7/12 428/354 |
| 2014/0368572 A1 | 12/2014 | Goto | |

FOREIGN PATENT DOCUMENTS

| | | |
|---|---|---|
| CN | 101944306 | 1/2011 |
| CN | 102898895 | 1/2013 |
| CN | 103319936 | 9/2013 |
| CN | 203174437 | 9/2013 |
| CN | 103694798 | 4/2014 |
| CN | 104419250 | 3/2015 |
| CN | 104946007 | 9/2015 |
| CN | 105951519 | 9/2016 |
| CN | 105951520 | 9/2016 |

* cited by examiner

WATER-INDUCED ANTI-COUNTERFEITING PAPER AND PREPARATION METHOD THEREOF

CROSS-REFERENCE TO RELATED APPLICATION

This application is a 371 of international application of PCT application serial no. PCT/CN2016/109353, filed on Dec. 10, 2016, which claims the priority benefit of China application no. 201610282047.1, filed on Apr. 28, 2016. The entirety of each of the above-mentioned patent applications is hereby incorporated by reference herein and made a part of this specification.

BACKGROUND OF THE INVENTION

1. Technical Field

The present invention belongs to the field of anti-counterfeiting technology of paper, and specifically relates to a water-induced anti-counterfeiting paper and a preparation method thereof.

2. Description of Related Art

With the economic development and improvement of living standards of people, people's pursuit of product quality is getting higher and higher. However, phenomenon of fake, shoddy and piracy have not been effectively restricted, which has brought huge losses to consumers, enterprises and the country. Therefore, strengthening research of anti-counterfeiting technology, constantly introducing new anti-counterfeiting products, and enhancing the technical content and imitation difficulty of anti-counterfeiting products, are having an important role and significance to safeguard the normal interests of consumers, enterprises and the country, and to protect their intellectual property.

In the field of anti-counterfeiting technology of paper, the most common anti-counterfeiting methods are watermark, security thread, anti-counterfeiting fiber, optically variable ink, thermosensitive color development, and other technologies. In particular, watermark anti-counterfeit has emerged for more than a hundred years, being the most widely used in the field of anti-counterfeiting paper in China, but it is also easy to be imitated. Although security thread in anti-counterfeit is simple to identify, safe and reliable, specialized production equipment is required, with expensive investment and complex process. Most of the fluorescent anti-counterfeiting fibers are made from synthetic fibers having poor dispersity in the process of paper making and being easy to generate flocculation affecting the production. As for other photosensitive or thermosensitive anti-counterfeiting papers, photo-induced color-developing anti-counterfeit (such as Shi-Rong HU et al., PHOTOCHROMIC ANTI-COUNTERFEITING INK: China, CN201210086624.0, [P]. Mar. 22, 2012) often requires a specific wavelength of light irradiation for color development, and is required to meet the requirements on the weather or the equipment; thermosensitive color development (such as Heng CHEN, REVERSIBLE THERMOCHROMIC COLOR-VARIABLE ANTI-COUNTERFEITING INK: China, CN96118606.2, [P]. Jul. 30, 1997) often requires to have an external heat source, or contain heavy metals, which has a certain safety risk; a pressure-sensitive color-developing anti-counterfeiting ink is often a non-reversible anti-counterfeiting ink, the patent CN201310658921.2 (Youkang LIN, REVERSIBLE PRESSURE-SENSITIVE COLOR-VARIABLE ANTI-COUNTERFEITING INK AND PREPARATION METHOD THEREOF: China, CN201310658921.2, [P]. Dec. 6, 2013) discloses a reversible pressure-sensitive color-variable anti-counterfeiting ink which is more convenient to operate, but its ink printing surface is limited to be white, and there are certain limitations in the printing industry. In addition, there are some anti-counterfeiting inks which are added with special substances, which can be identified by specific auxiliary equipment under specific conditions, and there are subjected to certain limitations in its actual promotion.

SUMMARY OF THE INVENTION

An objective of the present invention is to broaden the existing anti-counterfeiting technology of paper in the field, and provide a water-induced anti-counterfeiting technology. Specific technical solution is as follows:

A water-induced anti-counterfeiting paper, the anti-counterfeiting paper consists of a base paper layer and an anti-counterfeiting label thereon.

Further, the base paper layer of the anti-counterfeiting paper is writing paper, art paper, newsprint, printer paper, drawing paper, bond paper, cardboard paper, offset paper, paper for account books, bible paper or kraft paper that is made from plant fibers, having a basis weight of 20 g/m² to 200 g/m², and a Cobb60 value of 5 g/m² to 100 g/m².

Further, a pattern or a character as the anti-counterfeiting label is colorless and invisible, and does not have any effect on the appearance of the base paper.

Further, a functional ink used for the anti-counterfeiting label comprises components (in parts by weight) as follows: a filler: 1 to 25 parts; an adhesive: 3 to 50 parts; a surfactant: 3 to 75 parts; a vegetable oil: 0 to 20 parts; an inorganic additive: 3 to 30 parts; a rheological agent: 1 to 15 parts; and a solvent: 3 to 50 parts.

Further, the filler is calcium carbonate, magnesium carbonate, barium sulfate, calcium sulfate, kaolin (porcelain clay), mica powder, montmorillonite, silicon dioxide, aluminum hydroxide, or aluminum oxide; the adhesive is epoxy resin, acrylic resin, polyvinyl alcohol, natural resin, guar gum, chitosan, cellulose derivative, starch, sodium alginate, styrene-butadiene latex, or styrene-acrylic emulsion; the surfactant is alkyl alcohol ether carboxylate (AEC), alkyl phosphate carboxylate, alkyl sulfonate, alkylbenzene sulfonate, sulfamate, higher fatty alcohol sulfate, fatty glyceride, polysorbate (tween), fatty alcohol polyoxyethylene ether, alkylphenol ethoxylates, or alcohol compounds; the vegetable oil is tung oil, linseed oil, stillingia oil, soybean oil, rapeseed oil, castor oil, peanut oil, coconut oil, or cottonseed oil; the inorganic additive is sodium hydroxide, calcium hydroxide, hydrochloric acid, calcium chloride, nitrates, nitrites, or bicarbonates; the rheological agent is organic bentonite, diatomite, cellulose derivative, polyurethane, polyether, or acrylic acid; the solvent is ethanol, propanol, butanol, acetone, higher hydrocarbons, dimethylformamide, or dimethyl sulfoxide.

Further, the functional ink has a solid content of 5% to 60%, and a viscosity of 1 mPa·s to 10000 mPa·s. The ink has characteristics of water-based, environment friendly, and non-toxic.

Further, when the anti-counterfeiting paper contacts with water, a transparency of a location where the paper has the anti-counterfeiting label increases, and thereby a character or a pattern appears; after drying, the character or the pattern disappears, the paper reverts to normal, and a water-induced anti-counterfeiting feature detection of the paper is repeatable.

A preparation method of the abovementioned water-induced anti-counterfeiting paper having specific preparation steps as follows:

(1) mixing, dispersing and stirring a certain amount of a filler, an adhesive, a surfactant, a vegetable oil, an inorganic additive, a rheological agent and a solvent, after diluting to become a desired solid content by adding water, rolling to form various printing inks and inkjet inks;

(2) printing a desired anti-counterfeiting label at a surface of a base paper using the inks obtained from step 1) by printing, code-spurting or inkjet printing, obtaining the water-induced anti-counterfeiting paper after drying.

Compared with the prior art, the present invention has following advantages and technical effects:

(1) The anti-counterfeiting label of the water-induced anti-counterfeiting paper prepared in the present invention is colorless and invisible, and does not have any effect on an intrinsic color of the base paper.

(2) The water-induced anti-counterfeiting paper prepared in the present invention belongs to a novel method for anti-counterfeiting paper, a local transparency of the paper may be modified by water-inducing, and thereby a character or a pattern appears; after water evaporates, the transparency of the paper reverts to normal, the character or the pattern disappears, an anti-counterfeit effect is reversible, and the detection is repeatable.

(3) The water-induced anti-counterfeiting paper prepared in the present invention has an anti-counterfeiting features which is easy to detect, the anti-counterfeiting label may be printed at a specific location that is easy to identify; no special training is required; the character or the pattern is visible as long as an operator wipes a small amount of water at the specific location; by observing the appearance of printed character or pattern, the public can identify an authenticity of a product under the conditions of the first time and the first occasion.

DETAILED DESCRIPTION OF THE PREFERRED EMBODIMENT

Specific implementations of the present invention are further described below in combination with examples, but the implementations and the scope of protection of the present invention are not limited thereto.

Figure 1:
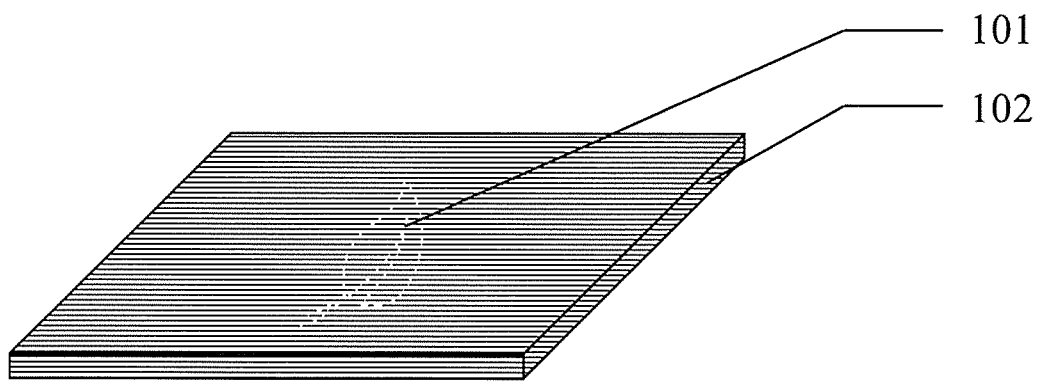
FIG. 1 is a structural schematic diagram of a water-induced anti-counterfeiting paper according to the present invention.
Figure 2:
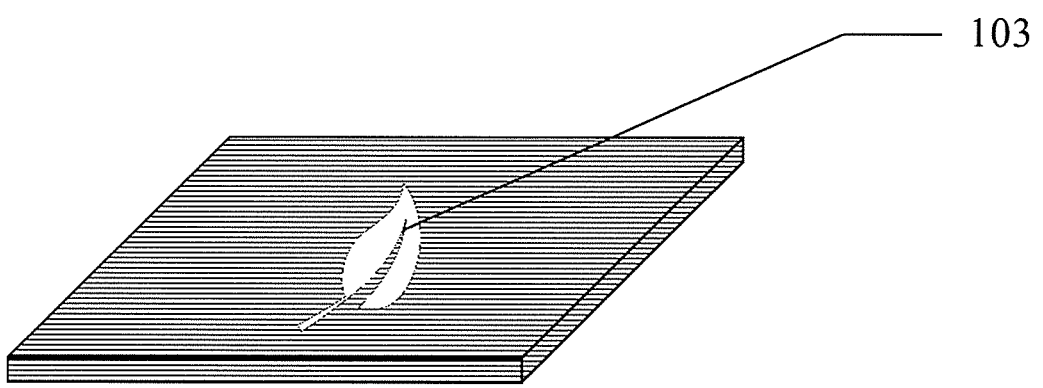
FIG. 2 is a schematic diagram of an anti-counterfeit effect of a water-induced anti-counterfeiting paper according to the present invention.

As shown in FIG. 1, a water-induced anti-counterfeiting paper according to the present invention is composed of a colorless and invisible anti-counterfeiting label 101 and a base paper layer 102. When contacting with water, a transparency of the paper at the location of anti-counterfeiting label 101 increases, and an anti-counterfeiting pattern or character 103 appears (as shown in FIG. 2).

Embodiment 1

An advanced bible paper is used as the base paper, having a basis weight of 20 $g/m^2$, and a Cobb60 value of 5 $g/m^2$.

25 g of a filler, 50 g of an adhesive, 3 g of a surfactant, 3 g of an inorganic additive, 1 g of a rheological agent and 13 g of a solvent were mixed, dispersed and stirred; water was added for diluting to have a solid content of 60%; and then it was rolled to form a flatbed printing ink with a viscosity of 10000 mPa·s. In particular, the filler is calcium carbonate, the adhesive is acrylic resin, the surfactant is sodium dodecyl benzene sulfonate, the inorganic additive is calcium chloride, the rheological agent is carboxymethyl-cellulose, and the solvent is ethanol. The desired anti-counterfeiting label was printed at a surface of the advance bible paper using the obtained flatbed printing ink by offset printing, and the water-induced anti-counterfeiting paper was obtained after drying.

By observation, the anti-counterfeiting label of the water-induced anti-counterfeiting paper according to the present invention is in a colorless and invisible state at the surface of the dried paper. After wiping with water, a transparency of a location where the paper has the anti-counterfeiting ink label is increased, and specific character or pattern was observed, with an obvious visual effect and clear details. After water evaporated, the appeared character or pattern disappeared, and the paper reverted to normal.

Embodiment 2

A cardboard paper is used as the base paper, having a basis weight of 200 $g/m^2$, and a Cobb60 value of 100 $g/m^2$.

1 g of a filler, 3 g of an adhesive, 75 g of a surfactant, 5 g of a vegetable oil, 5 g of an inorganic additive, 5 g of a rheological agent and 3 g of a solvent were mixed, dispersed and stirred; water was added for diluting to have a solid content of 5%; and then it was rolled to form a code-spurting ink with a viscosity of 100 mPa·s. In particular, the filler is kaolin, the adhesive is polyvinyl alcohol, the surfactant is dioctyl sodium sulfosuccinate, the vegetable oil is linseed oil, the inorganic additive is sodium carbonate, the rheological agent is hydroxypropyl methyl cellulose, and the solvent is isopropanol. The desired anti-counterfeiting label was printed at a surface of the cardboard paper using the obtained code-spurting ink by continuously code-spurting, the water-induced anti-counterfeiting paper was obtained after drying.

By observation, the anti-counterfeiting label of the water-induced anti-counterfeiting paper according to the present invention is in a colorless and invisible state at the surface of the dried paper. After wiping with water, a transparency of a location where the paper has the anti-counterfeiting ink label is increased, and specific character or pattern was observed, with an obvious visual effect and clear details. After water evaporated, the appeared character or pattern disappeared, and the paper reverted to normal.

Embodiment 3

A bond paper is used as the base paper, having a basis weight of 65 $g/m^2$, and a Cobb60 value of 25 $g/m^2$.

2 g of a filler, 5 g of an adhesive, 5 g of a surfactant, 20 g of a vegetable oil, 5 g of an inorganic additive, 15 g of a rheological agent and 45 g of a solvent were mixed, dispersed and stirred; water was added for diluting to have a solid content of 40%; and then it was rolled to form a code-spurting ink with a viscosity of 5 mPa·s. In particular, the filler is calcium carbonate, the adhesive is styrene-acrylic emulsion, the surfactant is sodium dodecyl benzene sulfonate, the vegetable oil is soybean oil, the inorganic additive is sodium nitrite, the rheological agent is polyvinyl alcohol (PVA1788), and the solvent is acetone. The desired anti-counterfeiting label was printed at a surface of the bond paper using the obtained code-spurting ink by continuously code-spurting, and the water-induced anti-counterfeiting paper was obtained after drying.

By observation, the anti-counterfeiting label of the water-induced anti-counterfeiting paper according to the present invention is in a colorless and invisible state at the surface of the dried paper. After wiping with water, a transparency of a location where the paper has the anti-counterfeiting ink label is increased, and specific character or pattern was observed, with an obvious visual effect and clear details. After water evaporated, the appeared character or pattern disappeared, and the paper reverted to normal.

Embodiment 4

A writing paper is used as the base paper, having a basis weight of 70 g/m$^2$, and a Cobb60 value of 40 g/m$^2$.

12 g of a filler, 30 g of an adhesive, 3 g of a surfactant, 10 g of an inorganic additive, 5 g of a rheological agent and 15 g of a solvent were mixed, dispersed and stirred; water was added for diluting to have a solid content of 45%; and then it was rolled to form a letterpress printing ink with a viscosity of 2000 mPa·s. In particular, the filler is kaolin, the adhesive is an oxidized starch gelatinized liquid, the surfactant is alkylphenol ethoxylates, the additive is ammonium nitrate, the rheological agent is guar gum, and the solvent is ethanol. The desired anti-counterfeiting label was printed at a surface of the writing paper using the obtained letterpress printing ink by flexography, and the water-induced anti-counterfeiting paper was obtained after drying.

By observation, the anti-counterfeiting label of the water-induced anti-counterfeiting paper according to the present invention is in a colorless and invisible state at the surface of the dried paper. After wiping with water, a transparency of a location where the paper has the anti-counterfeiting ink label increased, and specific character or pattern was observed, with an obvious visual effect and clear details. After water evaporated, the appeared character or pattern disappeared, and the paper reverted to normal.

Embodiment 5

A copy paper is used as the base paper, having a basis weight of 80 g/m$^2$, and a Cobb60 value of 25 g/m$^2$.

5 g of a filler, 8 g of an adhesive, 3 g of a surfactant, 30 g of an inorganic additive, 1 g of a rheological agent and 50 g of solvent were mixed, dispersed and stirred; water was added for diluting to have a solid content of 20%; and then it was rolled to form an inkjet ink with a viscosity of 1 mPa·s. In particular, the filler is calcium carbonate, the adhesive is acrylic resin, the surfactant is fatty alcohol polyoxyethylene ether, the inorganic additive is calcium chloride, the rheological agent is modified carboxymethylcellulose, and the solvent is ethanol. The desired anti-counterfeiting label was printed at a surface of the copy paper using the obtained inkjet ink by inkjet printing, and the water-induced anti-counterfeiting paper was obtained after drying.

By observation, the anti-counterfeiting label of the water-induced anti-counterfeiting paper according to the present invention is in a colorless and invisible state at the surface of the dried paper. After wiping with water, a transparency of a location where the paper has the anti-counterfeiting ink label is increased, and specific character or pattern was observed, with an obvious visual effect and clear details. After water evaporated, the appeared character or pattern disappeared, and the paper reverted to normal.

The above embodiments are the preferred embodiments of the present invention. However, the embodiments of the present invention are not limited to the above embodiments. Any other changes, modifications, substitutions, combinations and simplification, without departing from the spirit and material of the present invention, should be equivalent replacement, and are included in the scope of the present invention.

What is claimed is:

1. A water-induced anti-counterfeiting paper, consisting:
a base paper layer; and
an anti-counterfeiting label on the base paper layer,
wherein the anti-counterfeiting label of the water-induced anti-counterfeiting paper is colorless and invisible, and does not have any effect on an intrinsic color of the base paper layer,
wherein when the water-induced anti-counterfeiting paper contacts with water, a local transparency of the water-induced anti-counterfeiting paper where the anti-counterfeiting label is located increases, and thereby a character or a pattern of the anti-counterfeiting label appears; after drying, the character or the pattern disappears, the water-induced anti-counterfeiting paper reverted to normal, and a water-induced anti-counterfeiting feature detection of the water-induced anti-counterfeiting paper is repeatable,
wherein a functional ink used for the anti-counterfeiting label comprises components as follows: a filler: 1 to 25 parts by weight; an adhesive: 3 to 50 parts by weight; a surfactant: 3 to 75 parts by weight; a vegetable oil: 5 to 20 parts by weight; an inorganic additive: 3 to 30 parts by weight; and a rheological agent: 1 to 15 parts by weight.

2. The water-induced anti-counterfeiting paper according to claim 1, wherein the base paper layer is writing paper, art paper, newsprint, printer paper, drawing paper, bond paper, cardboard paper, offset paper, paper for account books, bible paper or kraft paper that is made from plant fibers, having a basis weight of 20 g/m$^2$ to 200 g/m$^2$, and a Cobb60 value of 5 g/m$^2$ to 100 g/m$^2$.

3. The water-induced anti-counterfeiting paper according to claim 1, wherein the filler is calcium carbonate, magnesium carbonate, barium sulfate, calcium sulfate, kaolin, mica powder, montmorillonite, silicon dioxide, aluminium hydroxide, or aluminium oxide; the adhesive is epoxy resin, acrylic resin, polyvinyl alcohol, natural resin, guar gum, chitosan, cellulose derivative, starch, sodium alginate, styrene-butadiene latex, or styrene-acrylic emulsion; the surfactant is alkyl alcohol ether carboxylate, alkyl phosphate carboxylate, alkyl sulfonate, alkylbenzene sulfonate, sulfamate, higher fatty alcohol sulfate, fatty glyceride, polysorbate, fatty alcohol polyoxyethylene ether, alkylphenol ethoxylates, or alcohol compounds; the vegetable oil is tung oil, linseed oil, stillingia oil, soybean oil, rapeseed oil, castor oil, peanut oil, coconut oil, or cottonseed oil; the inorganic additive is sodium hydroxide, calcium hydroxide, hydrochloric acid, calcium chloride, nitrates, nitrites, or bicarbonates; and the rheological agent is organic bentonite, diatomite, cellulose derivative, polyurethane, polyether, or acrylic acid.

4. The water-induced anti-counterfeiting paper according to claim 1, wherein the functional ink has a solid content of 5% to 60%, and a viscosity of 1 mPa·s to 10000 mPa·s.

5. A method of preparing the water-induced anti-counterfeiting paper according to claim 1, comprising specific preparation steps as follows:
   1) mixing, dispersing and stirring a filler, an adhesive, a surfactant, a vegetable oil, an inorganic additive, a rheological agent and a solvent, after diluting by adding water to have a desired solid content, rolling to form inks of various printing inks and inkjet inks;
   2) printing a desired anti-counterfeiting label at a surface of a base paper using the inks obtained from step 1) by printing, code-spurting or inkjet printing, obtaining the water-induced anti-counterfeiting paper after drying.

6. A method of preparing the water-induced anti-counterfeiting paper according to claim 2, comprising specific preparation steps as follows:
   1) mixing, dispersing and stirring a filler, an adhesive, a surfactant, a vegetable oil, an inorganic additive, a rheological agent and a solvent, after diluting by adding water to have a desired solid content, rolling to form inks of various printing inks and inkjet inks;
   2) printing a desired anti-counterfeiting label at a surface of a base paper using the inks obtained from step 1) by printing, code-spurting or inkjet printing, obtaining the water-induced anti-counterfeiting paper after drying.

7. A method of preparing the water-induced anti-counterfeiting paper according to claim 3, comprising specific preparation steps as follows:
   1) mixing, dispersing and stirring a filler, an adhesive, a surfactant, a vegetable oil, an inorganic additive, a rheological agent and a solvent, after diluting by adding water to have a desired solid content, rolling to form inks of various printing inks and inkjet inks;
   2) printing a desired anti-counterfeiting label at a surface of a base paper using the inks obtained from step 1) by printing, code-spurting or inkjet printing, obtaining the water-induced anti-counterfeiting paper after drying.

8. A method of preparing the water-induced anti-counterfeiting paper according to claim 4, comprising specific preparation steps as follows:
   1) mixing, dispersing and stirring a filler, an adhesive, a surfactant, a vegetable oil, an inorganic additive, a rheological agent and a solvent, after diluting by adding water to have a desired solid content, rolling to form inks of various printing inks and inkjet inks;
   2) printing a desired anti-counterfeiting label at a surface of a base paper using the inks obtained from step 1) by printing, code-spurting or inkjet printing, obtaining the water-induced anti-counterfeiting paper after drying.

* * * * *